United States Patent
Kalis (10) Patent No.: US 9,580,031 B2
(45) Date of Patent: Feb. 28, 2017

(54) AUTOMOBILE SEAT DIVIDER—THE BACKSEAT BUDDY

(71) Applicant: Jennifer Kalis, Powell, OH (US)

(72) Inventor: Jennifer Kalis, Powell, OH (US)

( * ) Notice: Subject to any disclaimer, the term of this patent is extended or adjusted under 35 U.S.C. 154(b) by 0 days.

(21) Appl. No.: 14/139,272

(22) Filed: Dec. 23, 2013

(65) Prior Publication Data

US 2016/0250986 A1    Sep. 1, 2016

(51) Int. Cl.
*B60R 21/02* (2006.01)
*B60N 3/10* (2006.01)
*B60N 2/58* (2006.01)
*B60R 21/06* (2006.01)

(52) U.S. Cl.
CPC .............. *B60R 21/02* (2013.01); *B60N 2/58* (2013.01); *B60N 3/10* (2013.01); *B60R 21/06* (2013.01); *B60R 2021/0293* (2013.01)

(58) Field of Classification Search
CPC . B60R 21/06; B60R 2021/0266; B60R 21/02; B60R 21/12; B60N 2/58; B60N 2/01; B60N 3/10
USPC ............ 296/24.46; 297/464, 256.16, 411.24, 297/411.36, 253, 423.41; 5/513
See application file for complete search history.

(56) References Cited

U.S. PATENT DOCUMENTS

| | | | |
|---|---|---|---|
| 1,239,166 A | 9/1917 | Dean | |
| 2,006,883 A | 7/1935 | Davies et al. | |
| 3,606,461 A * | 9/1971 | Moriyama | A47C 3/16 297/118 |
| 4,118,812 A | 10/1978 | Pangburn | |
| 4,595,227 A | 6/1986 | Setina | |
| 4,938,401 A | 7/1990 | Weisbrodt et al. | |
| 5,054,837 A | 10/1991 | Chapman | |
| 5,123,707 A | 6/1992 | Wurzell | |
| 5,255,958 A * | 10/1993 | Frischmann | B60N 2/28 297/232 |
| 5,518,293 A | 5/1996 | Coy et al. | |
| 5,560,058 A * | 10/1996 | Smith | A47C 21/00 5/513 |
| 5,560,680 A | 10/1996 | Salvador et al. | |
| 5,971,487 A * | 10/1999 | Passehl | B60N 2/28 108/44 |
| 7,344,193 B1 * | 3/2008 | Carrier | A47B 39/00 297/248 |
| 2002/0180229 A1 * | 12/2002 | Wheat | B60P 3/03 296/24.46 |

(Continued)

*Primary Examiner* — Milton Nelson, Jr.
(74) *Attorney, Agent, or Firm* — The Law Office of Patrick F. O'Reilly III, LLC (57) ABSTRACT

A divider configured to be secured in the seats of automobiles for forming a physical barrier between passengers is disclosed herein. The divider can be used for children, pets, or adults. A rectangular prism shaped booster may be provided below the divider for raising the height of the divider. The profile of the divider is designed to fit securely against the back of a seat and the bottom of the seat. The curved front side of the divider allows the driver to view all passengers, maintain views out the windows, and still be an effective barrier without being so large as to be in the way. A notch is provided in the curved front side of the divider for receiving a seat belt or strap for securing the divider. The divider and the booster may have removable covers with pockets for holding items, such as water bottles, tissues, and wipes.

20 Claims, 9 Drawing Sheets

(56) References Cited

U.S. PATENT DOCUMENTS

2004/0032154 A1\* 2/2004 Menon ................. B60N 2/2809
  297/253
2011/0227391 A1\* 9/2011 Cahall ................... B60N 2/441
  297/464

\* cited by examiner

AUTOMOBILE SEAT DIVIDER—THE BACKSEAT BUDDY

FIELD OF THE INVENTION

The present invention relates generally to vehicular use, as a seat divider, to form a physical barrier between occupants of the seat. The divider has fabric covers, some of which will have a variety of pockets to serve as storage for items such as water bottles, tissues, wipes, video games, ipods, snacks etc.

BACKGROUND OF THE INVENTION

Passengers seated in the rear seat of an automobile may engage in fighting, or other behavior that may be distracting to the driver. There are many U.S. patents that attempt to solve this problem with a type of divider, for example, U.S. Pat. Nos. 1,239,166; 2,006,883: 4,118,812; 4,938,401; 5,123,707; 5,255,958; 5,518,293; 5,560,680; 5,054,837; 4,595,227.

However, none of the above prior patents address all of the necessary issues and concerns in one invention, for a safe, secure, effective divider for all ages. There is a need for a simple universal divider that is soft yet durable and strong, has multiple height options to fit various cars and individuals, can have multiple width options as needed to allow for the best functional divider that will fit in the space, while preventing the backseat passengers from seeing each other and touching each other, while also allowing the driver unobstructed view of the passengers and the road, can easily be attached securely in any car with either a lap belt or shoulder belt or if needed can attach with an additional accessory strap to the latch hooks included in many cars. The divider also has covers which could be made in various colors and patterns, and has various pockets to provide functional storage as well as loops to attach trash bags and other items.

SUMMARY OF THE INVENTION

The present divider is designed for children, persons with special needs or behavior issues, pets, and adults of all ages when traveling in the car. This divider is a simple, safe solution that could work in all types of cars and installs easily and quickly.

The divider is made of light, soft, strong, high density polyurethane foam that meets all required safety standards. It is portable and light, compresses enough for a secure fit in the car when strapped in with the seat belt or accessory strap, yet holds its shape and is very strong. It cannot be torn or ripped easily and has no hard edges or corners.

The divider has universal accessibility and can be installed in all types of backseats. In U.S. Pat. No. 5,971,487, Passehl suggests a similar foam divider but its installation depends solely on the ability to reach and fit on the front seat center console between the two front seats of the car to help secure the divider. This is very limiting and installation would not work in many cars, especially those with multiple rows of seats, no center console, extra narrow or wide space between the front seats, or a bench front seat. The present invention can be successfully installed in all types of cars and backseats.

The present divider's shape and size works to prevent visual and physical contact between the backseat passengers. The height of the divider is of a general starting size of 21" which is roughly the height of most backseats without head rests, and can be raised with additional rectangular boosters attached as needed for additional height. The width, generally starts at 8 inches wide as this is the size that works well for most vehicles, and other widths optional depending on vehicle size.

The divider is secured to the car by sliding the seatbelt into the front notch and buckling the divider into the seat. The seatbelt is pulled tight to compress the foam and keep the divider from moving around, even when pushed or shoved. The shoulder belt style is buckled in the same way, with the lap belt threading through the notch in the front of the divider. Once buckled, the seatbelt is pulled all the way out until it catches, and then is clicked back slowly to secure a tight fit. The shoulder belt slides behind the divider and between the divider and the back of the seat. If using the accessory strap, the strap is threaded through the notch and attached on each side to the available car seat metal loop using a caribiner or other various attachment accessory. The flexibility and simplicity in the installation of this divider is a great advantage.

The notch that is cut for the seatbelt placement, allows for the seatbelt or strap to lay flat and this allows the most secure fit. The notch places the seatbelt at the right angle and height for the tightest, strongest fit. The notch also shortens the necessary length of seatbelt or strap that is needed to secure the divider, as some seatbelts would not be long enough to reach around the front of the divider without the notch, and the divider needs to be this large to be effective. The notch is small enough to allow the seatbelt or strap to easily be put in place, but does not affect the strength of the divider or allow access through to the other side.

The applicant has invented a cover for this divider that has 2 parts, the bottom under-cover and the top cover. The functions of the bottom cover are to protect the foam, provide a way to attach the booster on the base if desired, attach to the top cover in the mid back of the divider, and cover and reinforce the seatbelt installation notch. The functions of the top cover are to cover the seatbelt and the foam with a functional material or decorative material, to protect the foam, provide extra loops for securing the back of the divider to the back headrests if desired, and having the option of storage pockets and loops to allow further attachments such as trash bags. The top cover's design allows for the shoulder belt to fit behind the divider without interfering with the cover and does not interfere with the buckling and installation process. The top cover can be lifted up to install the divider and does not have to be removed during installation.

Other related objects and advantages of the present invention will be apparent from the following illustrations.

DESCRIPTION OF THE PREFERRED EMBODIMENT

Figure 1:
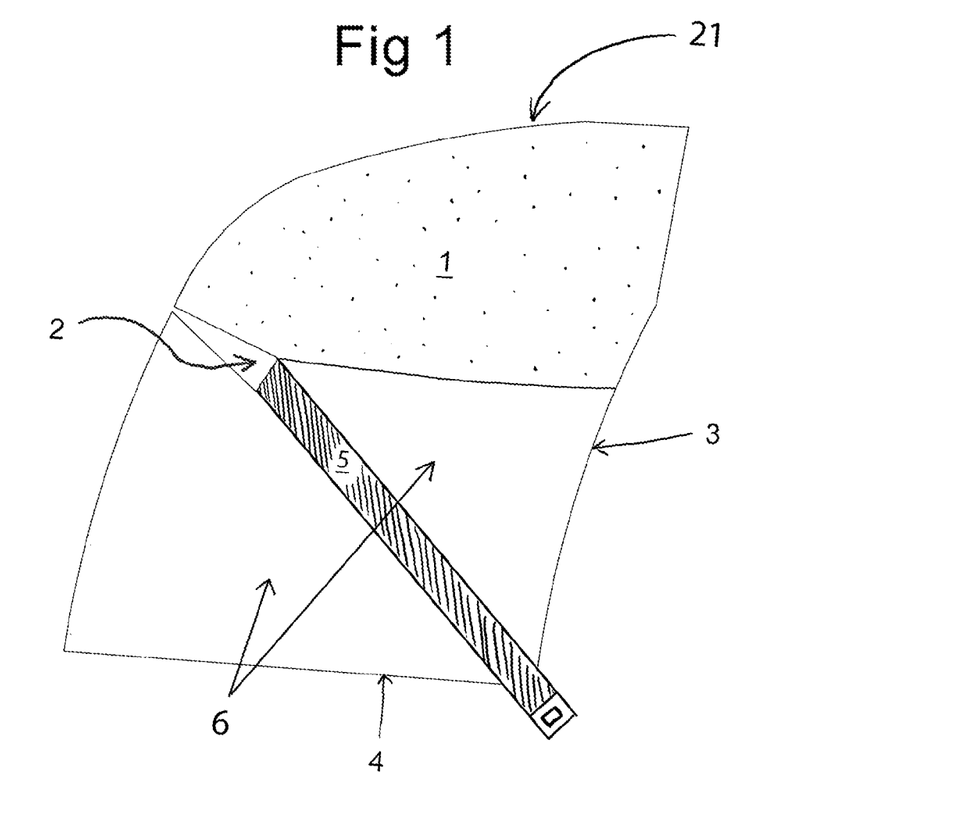
FIG. 1 is a side view of the present invention showing the shape of the foam or foam like material with the bottom cover in place over the foam, the seatbelt secured over the bottom cover, and shows the cut out slot in the foam for the seatbelt placement.

FIG. 1 shows the side view profile of the divider 1, with the bottom cover 6 in place, and the side view of the cut out notch/slit 2 for the placement of the seatbelt. The shape of the divider is designed to fit snugly in the seat, and has slight variations and angle changes. The back of the divider 3 is angled to fit securely against the back of the vehicle seat and the bottom of the divider 4 fits securely on the seat of the vehicle. The placement of the seatbelt 5 is secured in the notch/slit 2 which is angled downward to allow the flat part of the seatbelt to lay in the notch and create the strongest installation. The bottom cover has hook and loop or other ways of attaching a booster securely underneath it to add height to the whole divider if needed. The bottom cover wraps around the foam notch for the seatbelt and is reinforced through the notch to protect the foam when the divider is secured tightly and pulling and compressing the foam. The whole front side of the curved foam 21 is curved and angled in such a way that when placed in a vehicle, at the slight backward angle that most vehicle seats lean, it will still provide as much visibility as possible for the driver without eliminating any function of the divider.

Figure 2:
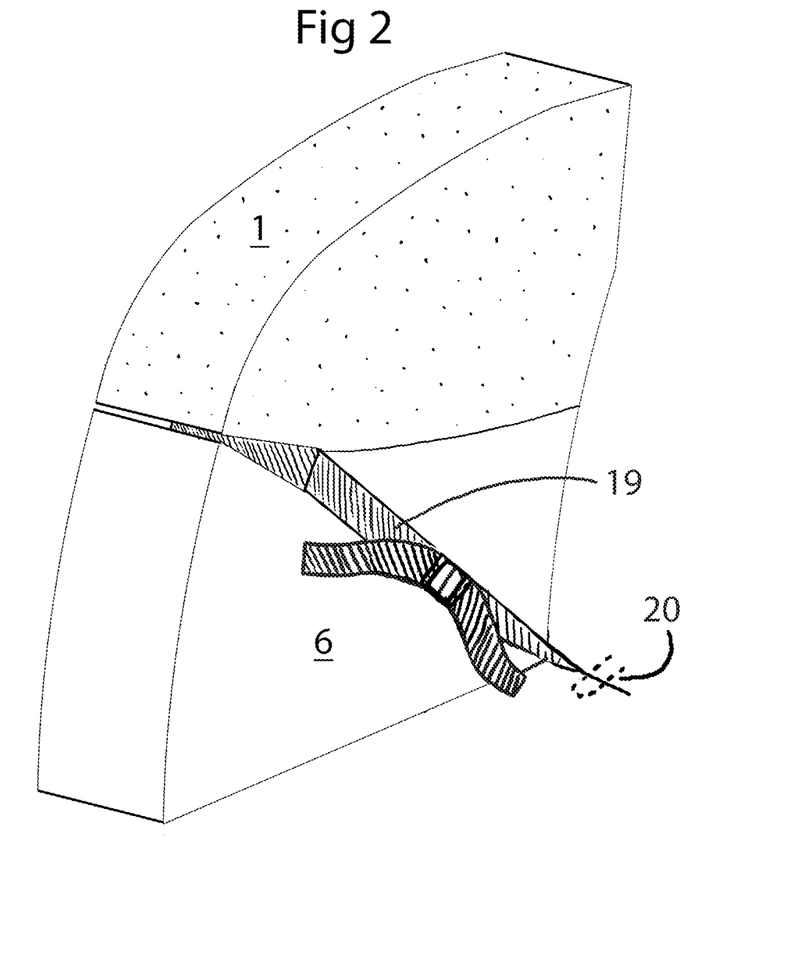
FIG. 2 is a perspective view of the divider with the bottom cover in place, the accessory strap secured through the divider over the bottom cover, and shows the cut out slot for the seatbelt placement and the accessory strap securing to the latch loop placed inside the seat crevice.

FIG. 2 shows a perspective view of the divider 1, with the bottom cover 6 in place, and the divider installed with an accessory strap 19 that could be made of lightweight polypropylene or similar material, hooked into the latch system 20 of the vehicle. The accessory strap hooks into the latch system on both sides of the divider and can be tightened as needed possibly with a side release double adjust buckle or other possible adjustable options. The strap can loop completely around the divider and tuck behind the divider in the crevice between the two latch connections or the strap can also double back around and pass through the notch twice with both ends in the latch hooks. The strap can be made of various strong adjustable material to hold a tight fit. The connector to the latch system could be caribiner style clips or other clips such as to hold the divider securely.

Figure 3:
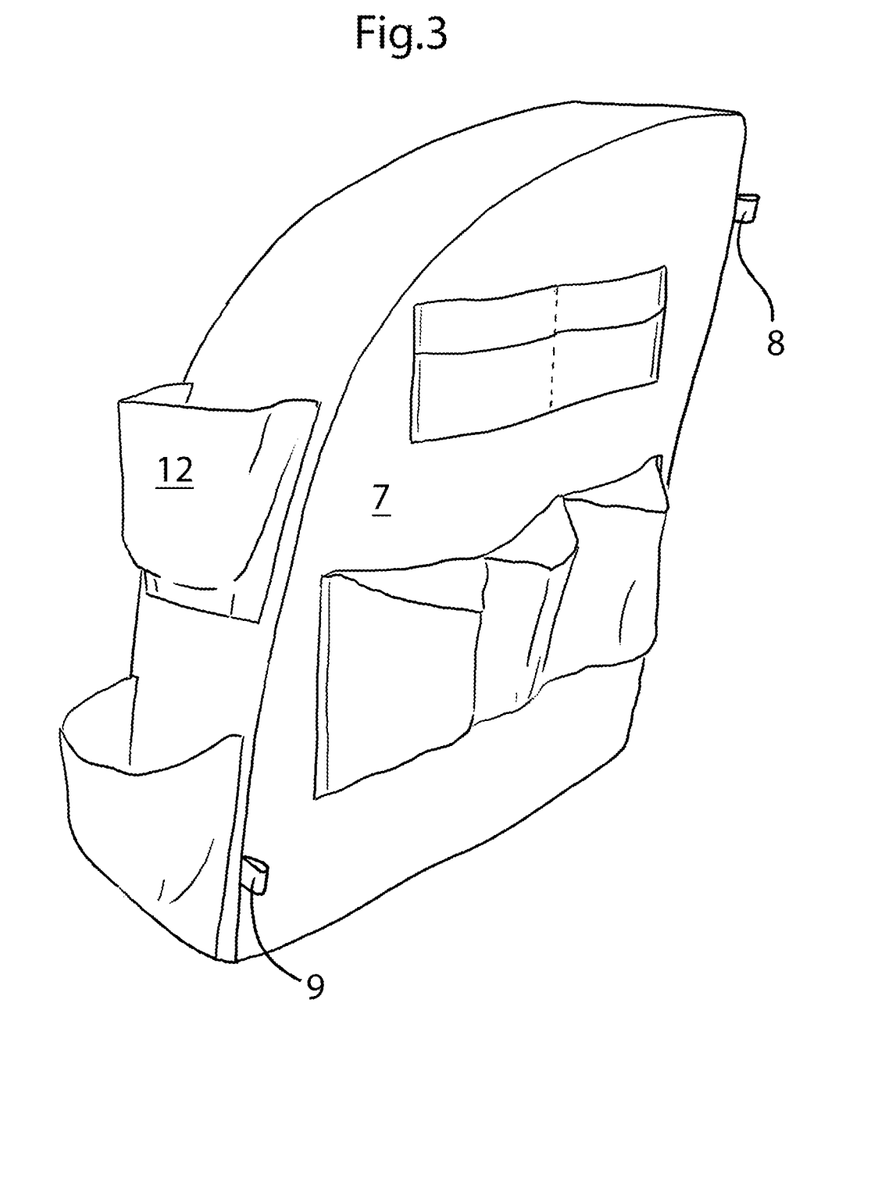
FIG. 3 is a perspective view of the divider with both the bottom and top covers in place and some possible pocket and loop placements.

FIG. 3 shows a perspective view of the divider with the top cover 7. This drawing shows examples of pockets 12 and possible placements, including 2 larger pockets on the front of the divider for items the front passengers could reach, such items that could fit would be tissue boxes, wipes boxes, water bottles etc. The pockets on the sides should be placed to allow access even if there was a child in a larger car seat. Pockets near the top would be smaller to hold and conceal items such as money, cell phones, media players etc. There could be 2 layers of pockets at the bottom that would be larger and sized to hold and conceal items such as handheld video games, books, digital tablets, water bottles, books, pencils etc. The pockets would serve the function of storage, and also of concealing items in the car when parked. The cover could be made in many different materials, such as waterproof pvc for a more utilitarian use, or organic cotton in a pretty print for a more fun personal use, to allow different users their preference depending on their need. There could be the addition of reinforced loops 8 and 9 to provide additional storage and accessory opportunities and more secure installation opportunities. The top loops 8 on both sides would provide the ability to secure the top of the divider to head rests if additional stability is needed. The bottom loops 9 could be used to attach additional accessories such as plastic trash bags.

Figure 4:
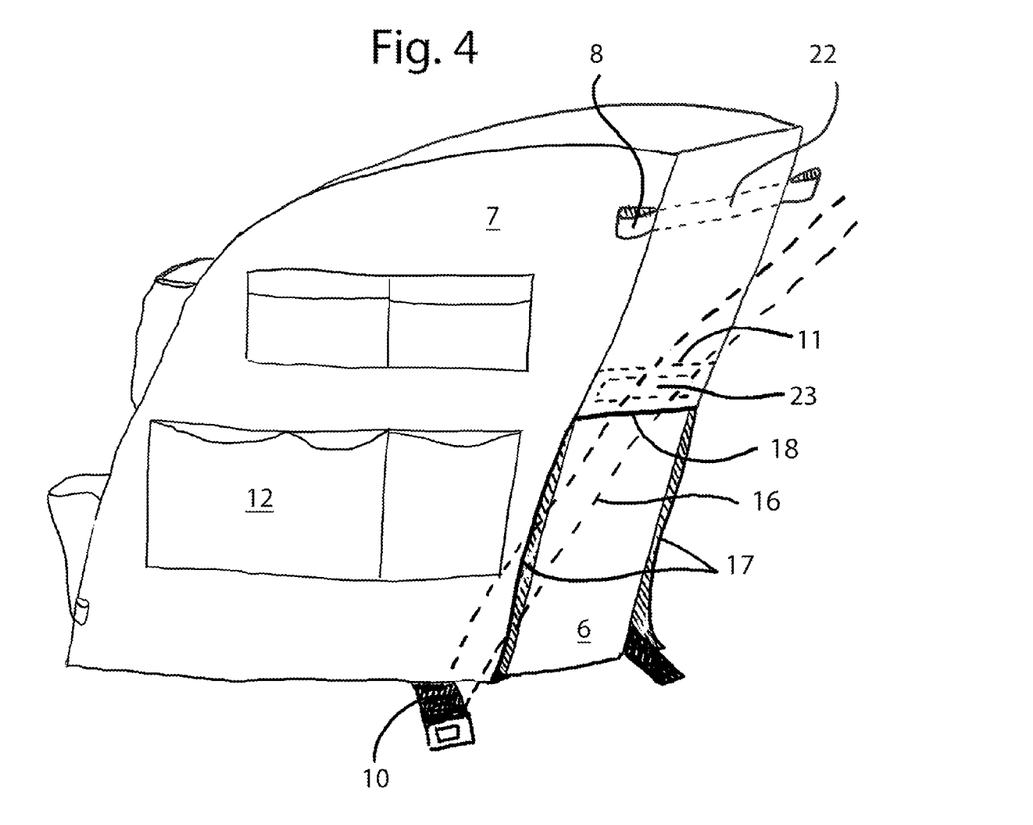
FIG. 4 is a side view of the divider with the bottom and top covers in place, with no foam showing.

FIG. 4 shows a back perspective view of the divider with the top cover 7 in place and the pocket 12 examples. The loops 8 can be reinforced 22. The top cover wraps around the back on the top half only and then loosely hangs down on both sides over the seat belt or strap. The bottom cover 6 attaches to the top cover 7 with hook and loop or similar means 23. The top edge of the bottom cover in the back is shown as 11. The back of the top cover 7 only covers the top half, stops around halfway down the back at bottom edge 18, and then the edges of the side panels 17 of the top cover loosely hang down over the seat belt or strap. This allows the shoulder strap 16 part of the shoulder seatbelt 10 to tuck behind the divider and slide out of the way between the divider and the seat.

Figure 5:
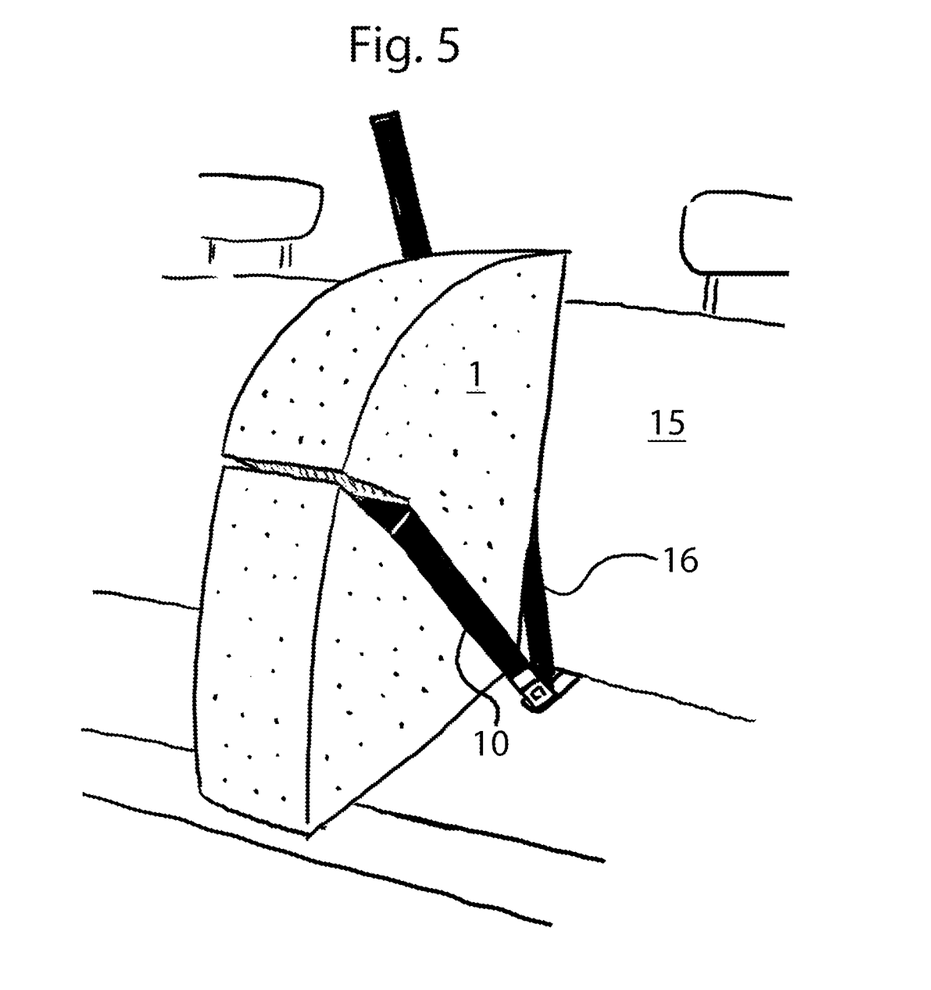
FIG. 5 is a perspective view of the present invention, without the covers, installed in a vehicle using a shoulder lap seat belt.

FIG. 5 shows a front perspective view of the foam divider 1, without a cover, installed in the vehicle with a shoulder belt 10, and demonstrates the placement of the shoulder part of the belt 16 sliding between the divider and the back of the vehicle seat 15.

Figure 6:
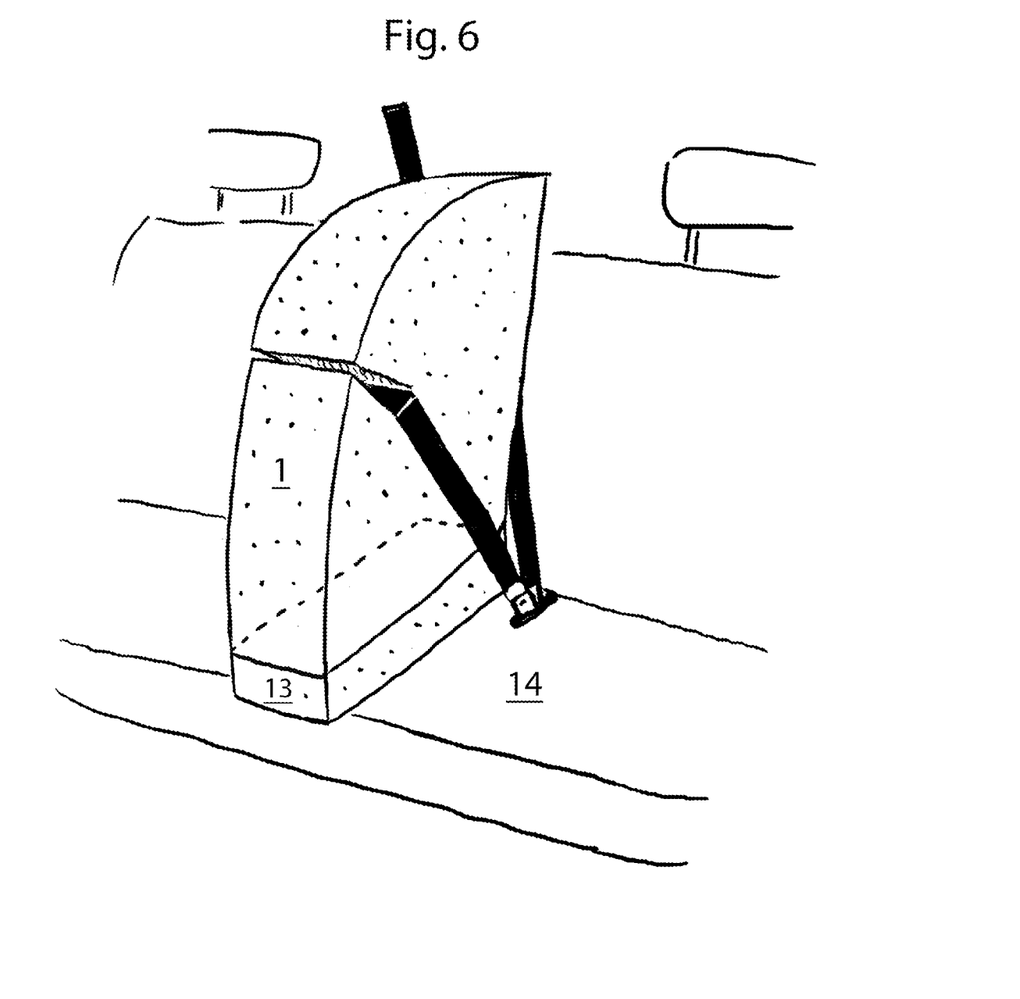
FIG. 6 is a perspective view of the present invention, without the covers, and including the additional booster, installed in a vehicle using a shoulder lap seat belt.

FIG. 6 shows the same perspective and situation as FIG. 5 but with the included booster 13 in place to elevate the height of the divider. Hook and loop or another similar means of attachment, sewn onto the top of the material covering the foam shape of the booster and sewn onto the bottom of the material of the bottom cover of the divider would provide a secure fit and the two pieces of foam would combine to form a larger divider. The booster 13 would rest firmly on the seat of the vehicle 14 and would also have a cover sewn on to protect the foam and allow the booster to securely attach to the divider cover.

Figure 7:
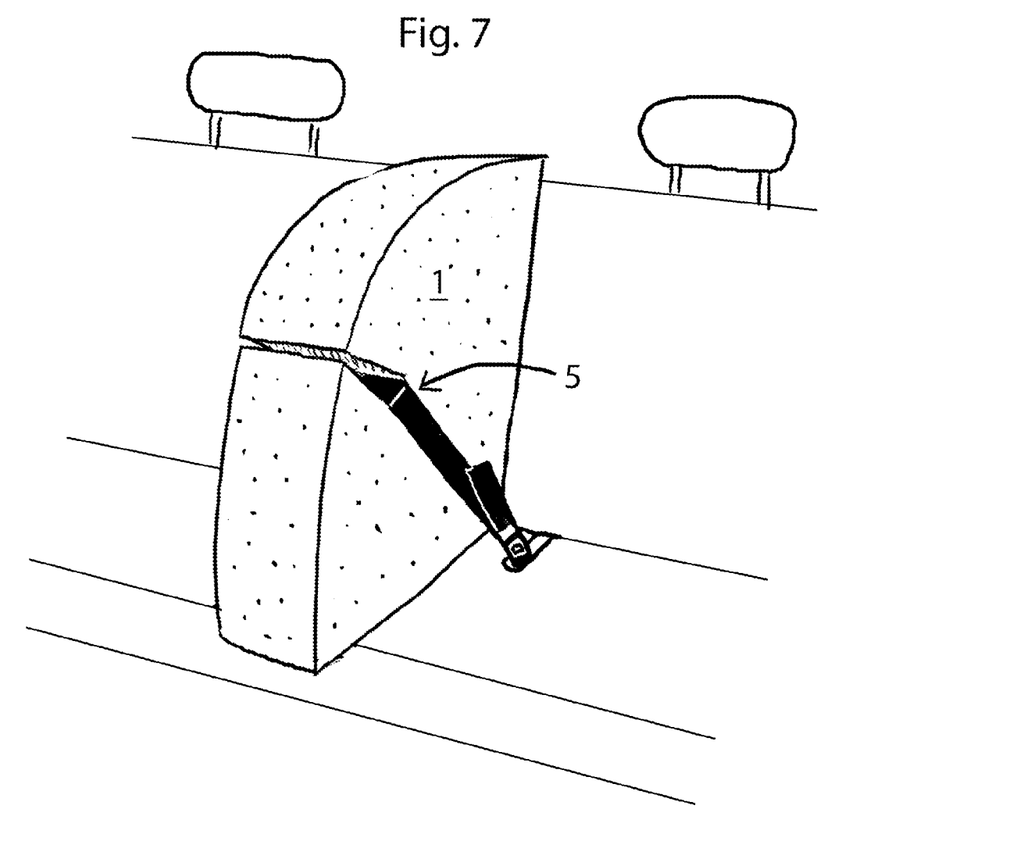
FIG. 7 is a perspective view of the present invention, without the covers, installed in a vehicle using a lap belt.
Figure 8:
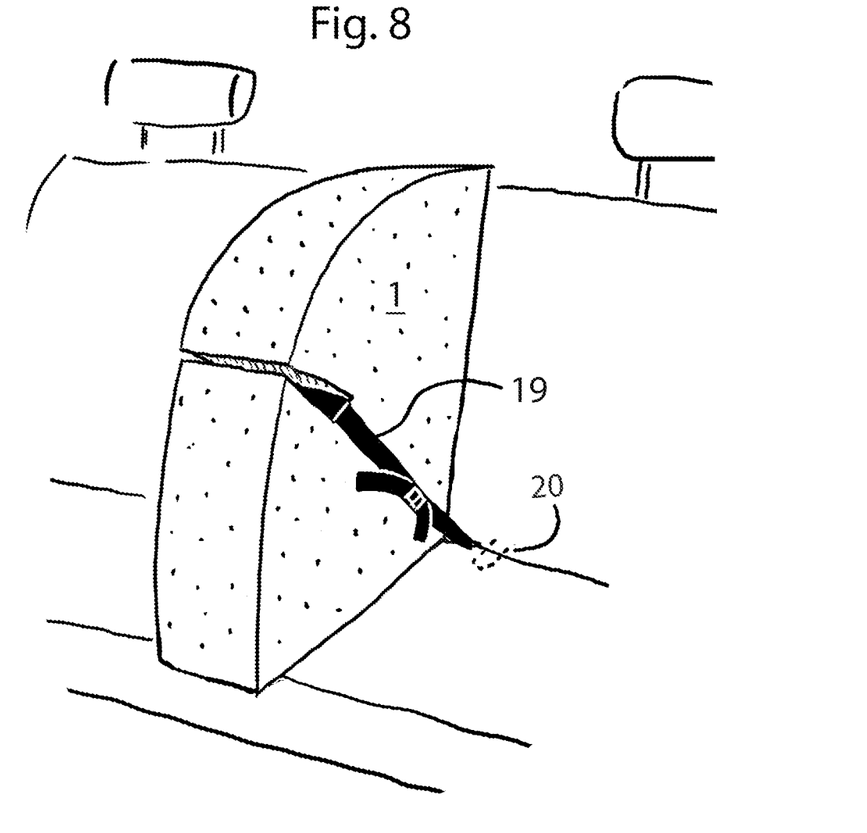
FIG. 8 is a perspective view of the present invention, without the covers, installed in a vehicle using an accessory strap with an adjustable buckle and securing to the latch system in the vehicle.

FIG. 7 shows the same view as FIGS. 5 and 6, but this demonstrates the divider 1 being secured with just a lap belt 5. FIG. 8 shows the same view as FIG. 5 and FIG. 6 and FIG. 7, but with the divider installed with an adjustable accessory strap 19 and hooked into the vehicle latch system 20.

Figure 9:
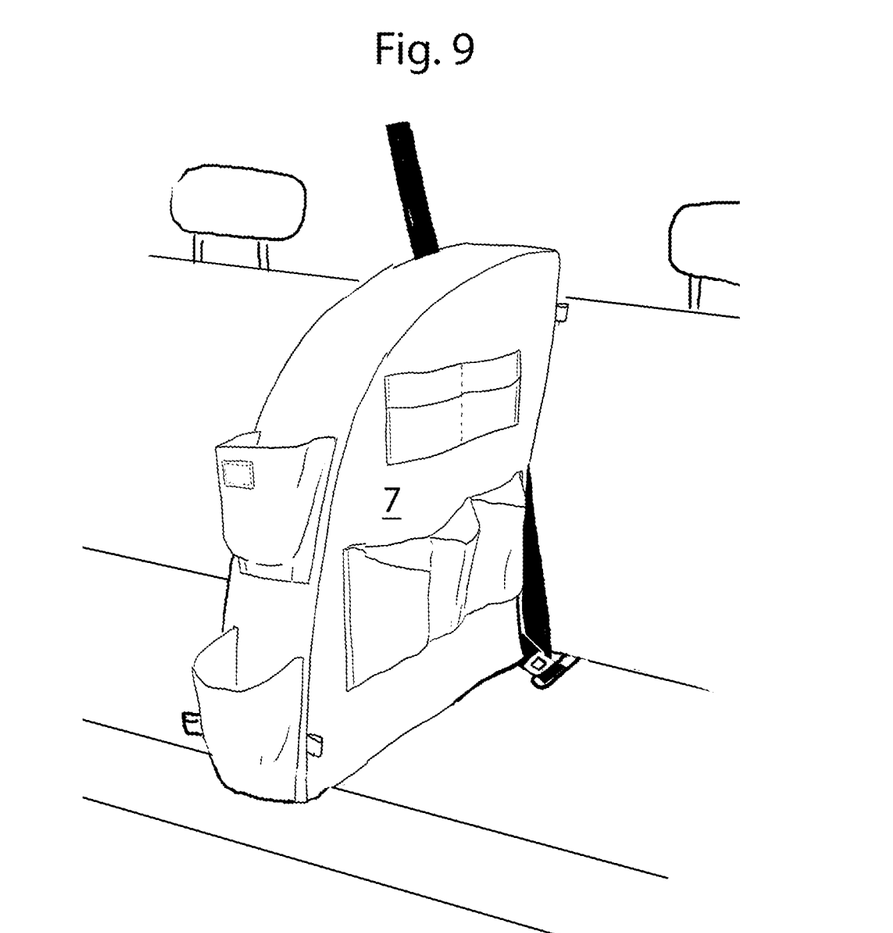
FIG. 9 is a perspective view of the present invention, with the bottom and top covers in place, installed using a shoulder belt.

FIG. 9 shows the divider with the top cover 7 on, buckled into the vehicle with a shoulder harness tucking behind the divider.

Additional modifications and improvements of the invention may also be apparent to those skilled in the art. Thus, the particular combination of parts described and illustrated herein is intended to represent only one embodiment of the invention, and is not intended to serve as limitations of alternative devices within the spirit and scope of the invention. There may be other modifications and changes obvious to those of ordinary skill in the art that fall within the scope of the present invention which should be limited only by the following claims and their legal equivalents.

What is claimed is:

1. A portable seat divider apparatus positionable upon a seat of a vehicle to form a partition, said portable seat divider apparatus comprising:

a vertically-extending divider, said vertically-extending divider having a curved front side that is substantially in the shape of a quarter circle;

a notch disposed in said curved front side of said vertically-extending divider of said portable seat divider apparatus, said notch being bounded by a top bounding surface, a bottom bounding surface, and a rear bounding surface, said top bounding surface being spaced apart from said bottom bounding surface by a gap, each of said top and bottom bounding surfaces being downwardly angled from said curved front side of said vertically-extending divider to an interior of said vertically-extending divider, and said notch configured to receive a seat belt or strap for securing said portable seat divider apparatus to said vehicle, such that when secured, said portable seat divider apparatus is compressed against said seat of said vehicle, providing secure retention of said portable seat divider apparatus; and a substantially rectangular prism shaped booster accessory configured to be secured under said vertically-extending divider to elevate said vertically-extending divider above said seat.

2. The portable seat divider apparatus of claim 1, wherein said portable seat divider apparatus is made of a strong inflatable material.

3. The portable seat divider apparatus of claim 1, wherein the width of said vertically-extending divider is between 6 inches and 8 inches.

4. The portable seat divider apparatus of claim 1, wherein the height of said vertically-extending divider at the tallest point, not including said booster accessory, is between 23 inches and 25 inches.

5. The portable seat divider apparatus of claim 1, wherein the height of said booster accessory is between 2 and 4 inches, the width of said booster accessory is between 6 and 8 inches, and the length of said booster accessory is 20 inches.

6. The portable seat divider apparatus of claim 1, wherein said portable seat divider apparatus is configured to be secured to said vehicle using a center seat lap belt or a lap portion of a shoulder belt of said vehicle.

7. The portable seat divider apparatus of claim 1, wherein said portable seat divider apparatus is configured to be secured to said vehicle using an accessory adjustable strap secured to a latch system of said vehicle.

8. The portable seat divider apparatus of claim 1, wherein a width of said gap between said top bounding surface of said notch and said bottom bounding surface of said notch increases from said curved front side of said vertically-extending divider to said rear bounding surface of said notch.

9. The portable seat divider apparatus of claim 1, wherein said vertically-extending divider and said booster accessory are comprised of high density polyurethane foam.

10. The portable seat divider apparatus of claim 9, wherein said vertically-extending divider and said booster accessory further comprise covers over said foam.

11. The portable seat divider apparatus of claim 10, wherein said covers are made of a water resistant synthetic material.

12. The portable seat divider apparatus of claim 10, wherein said covers are made of natural fabric.

13. The portable seat divider apparatus of claim 10, wherein one or more of said covers include pockets of different sizes and shapes.

14. The portable seat divider apparatus of claim 10, wherein said covers include a bottom cover for said vertically-extending divider, a top cover for said vertically-extending divider, and a separate cover for said booster accessory.

15. The portable seat divider apparatus of claim 14, wherein said top cover of said vertically-extending divider includes loops for additional accessories and options to secure said portable seat divider apparatus.

16. A portable seat divider apparatus positionable upon a seat of a vehicle to form a partition, said portable seat divider apparatus comprising:

a vertically-extending divider, said vertically-extending divider having a curved front side that is substantially in the shape of a quarter circle; and a notch disposed in said curved front side of said vertically-extending divider of said portable seat divider apparatus, said notch being bounded by a top bounding surface, a bottom bounding surface, and a rear bounding surface, said top bounding surface being spaced apart from said bottom bounding surface by a gap, each of said top and bottom bounding surfaces being downwardly angled from said curved front side of said vertically-extending divider to an interior of said vertically-extending divider, and said notch configured to receive a seat belt or strap for securing said portable seat divider apparatus to said vehicle, such that when secured, said portable seat divider apparatus is compressed against said seat of said vehicle, providing secure retention of said portable seat divider apparatus.

17. The portable seat divider apparatus of claim 16, wherein a width of said gap between said top bounding surface of said notch and said bottom bounding surface of said notch increases from said curved front side of said vertically-extending divider to said rear bounding surface of said notch.

18. A vehicle seat divider system, comprising:
a vehicle including a seat and a seat belt, said seat belt having a lap belt portion and a shoulder belt portion;
a portable seat divider apparatus positioned on said seat of said vehicle to form a partition, said portable seat divider apparatus including:
a vertically-extending divider, said vertically-extending divider having a curved front side that is substantially in the shape of a quarter circle and a rear side disposed opposite to said curved front side;
a notch disposed in said curved front side of said vertically-extending divider of said portable seat divider apparatus, said notch being bounded by a top bounding surface, a bottom bounding surface, and a rear bounding surface, said top bounding surface being spaced apart from said bottom bounding surface by a gap, each of said top and bottom bounding surfaces being downwardly angled from said curved front side of said vertically-extending divider to an interior of said vertically-extending divider, and said notch configured to receive said lap belt portion of said seat belt for securing said portable seat divider apparatus to said vehicle, such that when secured, said portable seat divider apparatus is compressed against said seat of said vehicle, providing secure retention of said portable seat divider apparatus;
wherein said shoulder belt portion of said seat belt is disposed between said rear side of said portable seat divider apparatus and a surface of said seat.

19. The vehicle seat divider system of claim 18, wherein a width of said gap between said top bounding surface of said notch and said bottom bounding surface of said notch increases from said curved front side of said vertically-extending divider to said rear bounding surface of said notch.

20. The vehicle seat divider system of claim 18, wherein said vertically-extending divider further comprises at least one cover, said at least one cover disposed over a portion of said lap belt portion of said seat belt.

\* \* \* \* \*